US011115086B1

(12) United States Patent
Berliner et al.

(10) Patent No.: US 11,115,086 B1
(45) Date of Patent: Sep. 7, 2021

(54) REFERENCE SIGNAL PORT ALLOCATION

(71) Applicant: QUALCOMM Incorporated, San Diego, CA (US)

(72) Inventors: Ran Berliner, Kfar-Aviv (IL); Shay Landis, Hod Hasharon (IL); Yehonatan Dallal, Kfar Saba (IL); Ronen Shaked, Kfar Saba (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/009,366

(22) Filed: Sep. 1, 2020

(51) Int. Cl.
*H04L 5/12* (2006.01)
*H04L 23/02* (2006.01)
*H04B 7/02* (2018.01)
*H04B 7/08* (2006.01)
*H04B 7/06* (2006.01)
*H04L 5/00* (2006.01)

(52) U.S. Cl.
CPC ........... *H04B 7/028* (2013.01); *H04B 7/0697* (2013.01); *H04B 7/0857* (2013.01); *H04L 5/0025* (2013.01)

(58) Field of Classification Search
CPC .... H04B 7/028; H04B 7/0697; H04B 7/0857; H04L 5/0025
USPC ......................................................... 375/262
See application file for complete search history.

(56) References Cited

U.S. PATENT DOCUMENTS

2019/0222385 A1* 7/2019 Hessler ................. H04L 5/0094
2020/0221323 A1* 7/2020 Xu ........................ H04L 5/0048
2020/0359404 A1* 11/2020 Nilsson ............... H04W 72/046

* cited by examiner

*Primary Examiner* — Tanmay K Shah
(74) *Attorney, Agent, or Firm* — Harrity & Harrity, LLP

(57) ABSTRACT

Various aspects of the present disclosure generally relate to wireless communication. In some aspects, a user equipment (UE) may receive multiple spatial dimension multiplexed (SDM) communications via a single antenna panel of the UE. The UE may perform phase noise correction for the multiple SDM communications based at least in part on phase tracking reference signals received via a single communication of the multiple SDM communications. Numerous other aspects are provided.

30 Claims, 9 Drawing Sheets

FIG. 4

REFERENCE SIGNAL PORT ALLOCATION

FIELD OF THE DISCLOSURE

Aspects of the present disclosure generally relate to wireless communication and to techniques and apparatuses for reference signal port allocation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes receiving multiple spatial dimension multiplexed (SDM) communications via a single antenna panel of the UE; and performing phase noise correction for the multiple SDM communications based at least in part on phase tracking reference signals (PT-RSs) received via a single communication of the multiple SDM communications.

In some aspects, a method of wireless communication performed by a base station includes determining that a UE is to receive multiple SDM communications associated with multiple transmission reception points (TRPs) via a single antenna panel of the UE; and configuring a single TRP, of the multiple TRPs, to transmit PT-RSs with a communication, of the multiple SDM communications, for the UE to use for phase noise correction of the multiple SDM communications.

In some aspects, a UE for wireless communication includes a memory; and one or more processors operatively coupled to the memory, the memory and the one or more processors configured to receive multiple SDM communications via a single antenna panel of the UE; and perform phase noise correction for the multiple SDM communications based at least in part on PT-RSs received via a single communication of the multiple SDM communications.

In some aspects, a base station for wireless communication includes a memory; and one or more processors operatively coupled to the memory, the memory and the one or more processors configured to determine that a UE is to receive multiple SDM communications associated with multiple TRPs via a single antenna panel of the UE; and configure a single TRP, of the multiple TRPs, to transmit PT-RSs with a communication, of the multiple SDM communications, for the UE to use for phase noise correction of the multiple SDM communications.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
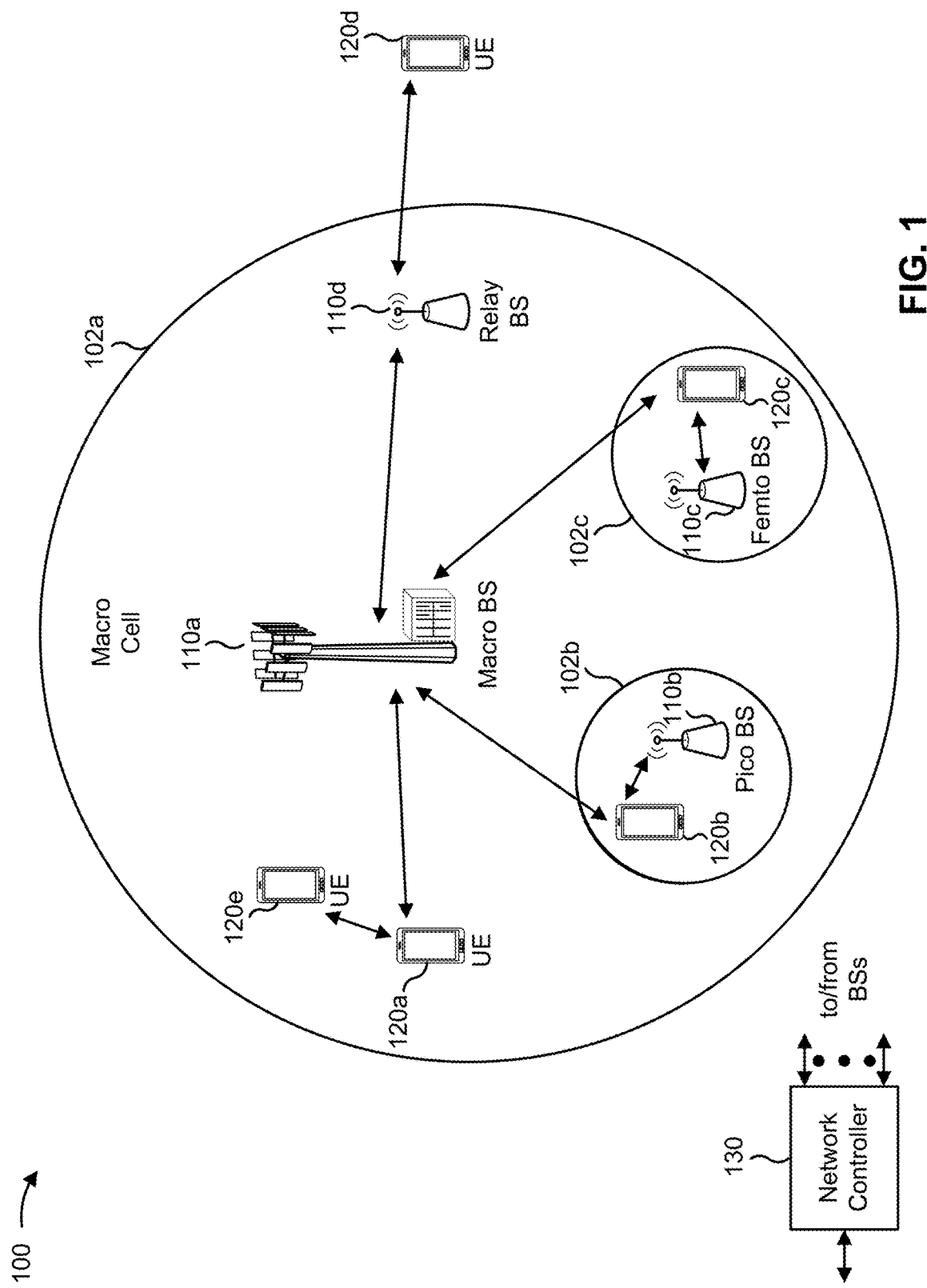
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
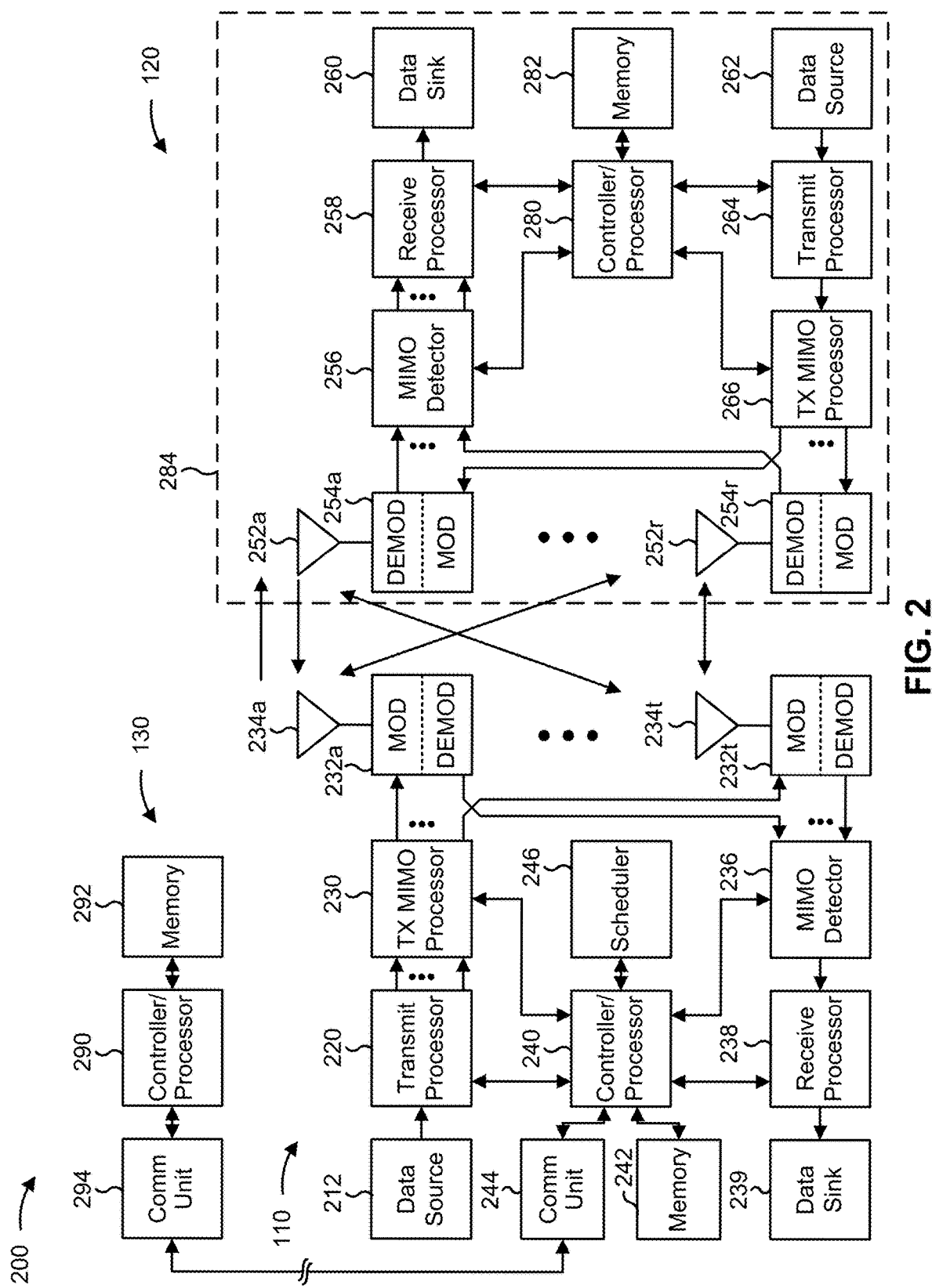
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-9.

Controller/processor 240 of base station 110, controller/processor 280 of UE 120, and/or any other component(s) of FIG. 2 may perform one or more techniques associated with reference signal port allocation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like.

In some aspects, UE 120 may include means for receiving multiple SDM communications via a single antenna panel of the UE; means for performing phase noise correction for the multiple SDM communications based at least in part on PT-RSs received via a single communication of the multiple SDM communications; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining that a UE is to receive multiple SDM communications associated with multiple TRPs via a single antenna panel of the UE; means for configuring a single TRP, of the multiple TRPs, to transmit PT-RSs with a communication, of the multiple SDM communications, for the UE to use for phase noise correction of the multiple SDM communications; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
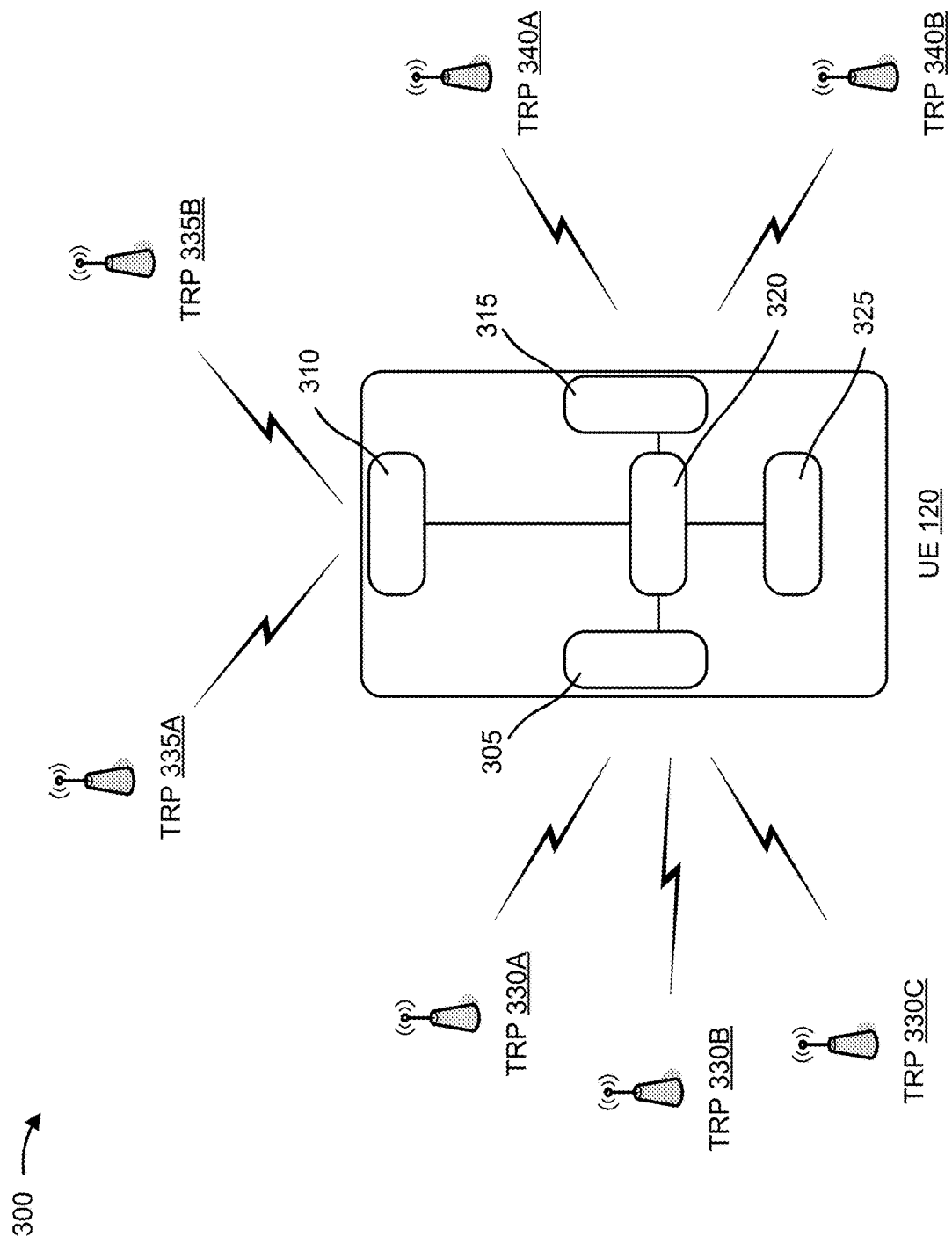
FIG. 3 is a diagram illustrating an example of communications with multiple transmission reception points, in accordance with various aspects of the present disclosure.

FIG. 3 is a diagram illustrating an example 300 of communications with multiple transmission reception points, in accordance with various aspects of the present disclosure. As shown, a UE 120 may communicate with TRP group 330 (including TRP 330A, TRP 330B, and TRP 330C), TRP group 335 (including TRP 335A, TRP 335B, and TRP 335C), TRP group 340 (including TRP 340A and TRP 340B,) via a wireless network. TRP group 330, TRP group 335, and TRP group 340 may be configured by one or more base stations to communicate with the UE 120.

As shown in FIG. 3, the UE 120 may communicate with the TRP group 330 via a first antenna panel 305, may communicate with the TRP group 335 via a second antenna panel 310, and may communicate with the TRP group 340 via a third antenna panel 315. The UE 120 may down-sample signals received at the antenna panels 305, 310, 315 from a radio frequency (e.g., a carrier frequency) to an intermediate frequency (IF) for each antenna panel. After down-sampling the signals per antennal panel, the UE 120 may forward the signals to an IF to baseband (BB) converter 320. The IF to BB converter 320 may down-sample the signals from the IF frequency range to a BB frequency range. The UE 120 may forward the signals to one or more BB logic devices 325 to convert the signals to data, control information, and/or the like.

In some wireless networks (e.g., using communications in a millimeter range, a sub-terahertz range, and/or the like), the TRPs of the TRP groups 330, 335, 340 may transmit signals with PT-RSs. The UE may use the PT-RSs to estimate and remove phase noise from the signals. In this way, the UE may improve a likelihood of decoding the signals.

Phase noise of signals may be caused, for example, when a TRP up-samples information of the signal to an RF (e.g., a carrier frequency). Additionally, or alternatively, phase noise of signals may be caused, for example, when the UE 120 down-samples the signals to the IF frequency range. In some networks, phase noise of signals caused by the UE 120 down-sampling the signals may be greater than phase noise of the signals caused by a TRP up-sampling the signals. For example, up-sampling the signals may cause phase noise of −40 Decibels (dBs) below carrier and down-sampling the signals may cause phase noise of −30 dBs below carrier.

In some networks, each TRP may transmit a signal to the UE 120 with each signal including PT-RSs so the UE 120 may estimate and correct phase noise for each signal, individually. In this way, the UE 120 may estimate and correct phase noise, including receiver-caused phase noise and transmitter-caused phase noise, to improve a likelihood of decoding the signals. However, by having PT-RSs in each signal, the TRPs may consume communication and network signals that may have otherwise been used to carry data. Additionally, or alternatively, the UE 120 may consume computing resources to process the PT-RSs, estimate the phase noise, and correct the phase noise for each signal.

As indicated above, FIG. 3 is provided as an example. Other examples may differ from what is described with respect to FIG. 3.

In some aspects described herein, a UE may estimate and correct phase noise per UE antenna panel. For example, the UE may estimate phase noise and apply a phase noise correction to multiple signals (e.g., spatial dimension multiplex signal) received via a single antenna panel of the UE. In some aspects, the UE may estimate the phase noise based at least in part on PT-RSs of a single communication of the multiple signals and then perform phase noise correction for the multiple signals based at least in part on the estimate of the phase noise. In this way, the UE may conserve computing resources that may otherwise have been used to process PT-RSs, estimate the phase noise, and correct the phase noise for each signal, individually.

In some aspect, the UE may estimate phase noise per antennal panel of the UE based at least in part on RF to IF down-sampling by the UE being a primary cause of phase noise. In some communication, correction of phase noise introduced by the UE by RF to IF down-sampling (e.g., receiver phase noise), without correction of phase noise introduced by the TRP, may be sufficient to operate with a desired modulation scheme (e.g., 256 quadrature amplitude modulation (QAM), 1K QAM, and/or the like).

In some aspects, a UE report may associate transmission configuration indicator (TCI) state identifications (e.g., for the multiple communications) with a single antenna panel. In other words, the UE may indicate TCI state identifications that are associated with the single antenna panel. In some aspects, the UE report may associate TCI state identifications and antenna panels. For example, the UE may transmit a CRI (CSI-RS Resource Indicator) based report and associated antenna panels (e.g., using an antenna panel index), as part of a report, such as a beam management procedure communication (e.g., a channel state information (CSI) resource index (CRI) RSRP report (e.g., CRI-L1-RSRP), a CRI signal to interference plus noise ratio (SINR) report (e.g., CRI-L1-SINR), and/or the like). In this way the base station may be determine which TRPs are to transmit signals to the UE via common antenna panels.

In some aspects, the base station may configure a single TRP, of multiple TRPs that are to transmit signals to a single panel of the UE, to transmit a signal with PT-RSs. In this way, the base station may conserve communication and/or network resources that may otherwise have been used to carry PT-RSs on each signal of the multiple TRPs.

Figure 4:
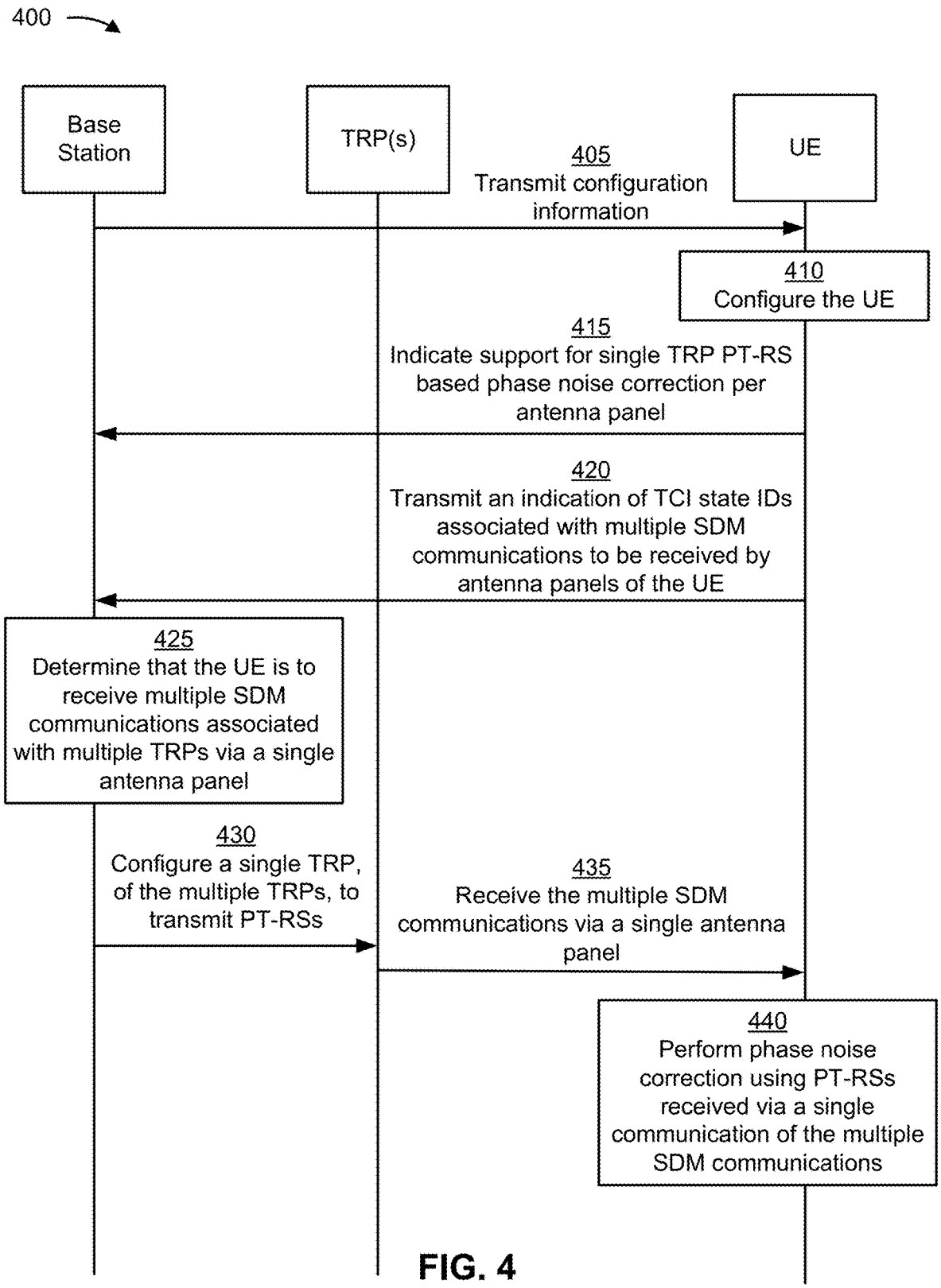
FIGS. 4 and 5 are diagrams illustrating examples associated with reference signal port allocation for communications with multiple transmission reception points, in accordance with various aspects of the present disclosure.

FIG. 4 is a diagram illustrating an example 400 associated with providing and/or using a multiple link capability report, in accordance with various aspects of the present disclosure. As shown in FIG. 4, a base station (e.g., base station 110) may communicate with a UE (e.g., UE 120), one or more TRPs, and/or the like. In some aspects, the base station may communicate with the UE via the one or more TRPs. In other words, the base station may configure the TRPs to communicate with the UE. The base station, the UE, and the one or more TRPs may be part of a wireless network (e.g., wireless network 100).

As shown by reference number 405, the base station may transmit, and the UE may receive, configuration information. In some aspects, the UE may receive the configuration information from another device (e.g., from another base station, another UE, and/or the like), as part of a specification of a communication standard, and/or the like. In some aspects, the UE may receive the configuration information via one or more of radio resource control (RRC) signaling, medium access control (MAC) signaling (e.g., MAC control elements (MAC CEs)), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to estimate and correct phase error for multiple communications received via a single antenna panel based at least in part on PT-RSs of a single communication (e.g., a spatial division multiplexed communication). In some aspects, the configuration information may indicate that the UE is to transmit an indication of an association of TCI state identifications with antenna panels of the UE. For example, the configuration information may indicate that the UE is to transmit a set of TCI state identifications (by CRI or synchronization signal block (SSB) identification based report, e.g. cri-L1-RSRP) and indications of which antenna panel of the UE the UE will use to receive communications transmitted by a TRP using each of the set of TCI state identifications.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the UE may indicate support for single TRP PT-RS based noise correction per antenna panel. In other words, the UE may transmit an indication that the UE is capable to perform noise correction, for multiple communications (e.g., from multiple TRPs) received via a single panel of the UE, using PT-RS from a signal TRP and/or received with a single communication of the multiple communications.

As shown by reference number 420, the UE may transmit, and the base station may receive, an indication of TCI state identifications (IDs) associated with multiple SDM communications to be received by antenna panels of the UE. In some aspects, the UE may transmit an indication of TCI state identifications, associated with multiple SDM communications, with the TCI state identifications associated with a single antenna panel of the UE.

In some aspects, the UE may transmit an indication that the TCI state identifications are associated with the single antenna panel of the UE. For example, the UE may report the TCI state identifications (e.g., as part of a beam management procedure) and indications of antenna panels that are associated with the TCI state identifications. In some aspects, the UE may transmit the TCI state identifications in a single communication with the indications of antenna panels that are associated with the TCI state identifications. In some aspects, the UE may transmit the single communication as part of a beam management procedure communication, an RSRP report (e.g., a CRI-L1-RSRP report), an SINR report (e.g., a CRI-L1-SINR report), and/or the like.

As shown by reference number 425, the base station may determine that the UE is to receive multiple SDM communications associated with multiple TRPs via a single antenna panel of the UE. In some aspects, the base station may determine that the UE is to receive the multiple SDM communications associated with the multiple TRPs via the single antenna panel of the UE based at least in part on receiving the indication from the UE.

In some aspects, the base station may receive a set of indications of TCI state identifications associated with one or more reference signals received by the UE via one or more TRPs and determine antenna panels of the UE that are associated with the TCI state identifications. The base station may determine that the UE is to receive the multiple SDM communications associated with the multiple TRPs via the single antenna panel of the UE based at least in part on determining the antenna panels of the UE that are associated with the TCI state identifications.

In some aspects, the base station may determine that the UE is to receive multiple additional SDM communications associated with multiple additional TRPs via an additional single antenna panel of the UE. The base station may configure a single additional TRP, of the multiple additional TRPs, to transmit PT-RSs with an additional communication of the multiple additional SDM communications for the UE to use for phase noise correction for the multiple additional SDM communication.

As shown by reference number 430, the base station may configure a single TRP, of the multiple TRPs, to transmit PT-RSs to the UE. In some aspects, the base station may configure, for different antenna panels of the UE, a single TRP to transmit an SDM communication.

As shown by reference number 435, the UE may receive the multiple SDM communications via a single antenna panel. In some aspects, the UE may receive multiple additional SDM communications via an additional single antenna panel.

As shown by reference number 440, the UE may perform phase noise correction using PT-RSs received via a single communication of the multiple SDM communications. In some aspects, the UE may identify the single communication that includes PT-RSs for phase noise estimation and correction. In some aspects, more than one communication may include PT-RSs, and the UE may identify the single communication to use for phase noise estimation and correction, and the UE may ignore PT-RSs of remaining communications that include PT-RSs. In some aspects, the phase correction may be based at least in part on receiver phase noise. In some aspects, the UE may perform phase noise correction for each signal (e.g., separately) based at least in part on a phase noise estimation that is based at least in part on the single communication of the multiple SDM communications.

Based at least in part on the base station configuring a single TRP, of the multiple TRPs that are to transmit signals to a single panel of the UE, to transmit a signal with PT-RSs, the base station may conserve communication and/or network resources that may otherwise have been used to carry PT-RSs on each signal of the multiple TRPs. Based at least in part on the UE estimating and correcting the phase noise based at least in part on PT-RSs of a single communication of the multiple signals, the UE may conserve computing resources that may otherwise have been used to process PT-RSs, estimate the phase noise, and correct the phase noise for each signal, individually.

As indicated above, FIG. 4 is provided as an example. Other examples may differ from what is described with respect to FIG. 4.

Figure 5:
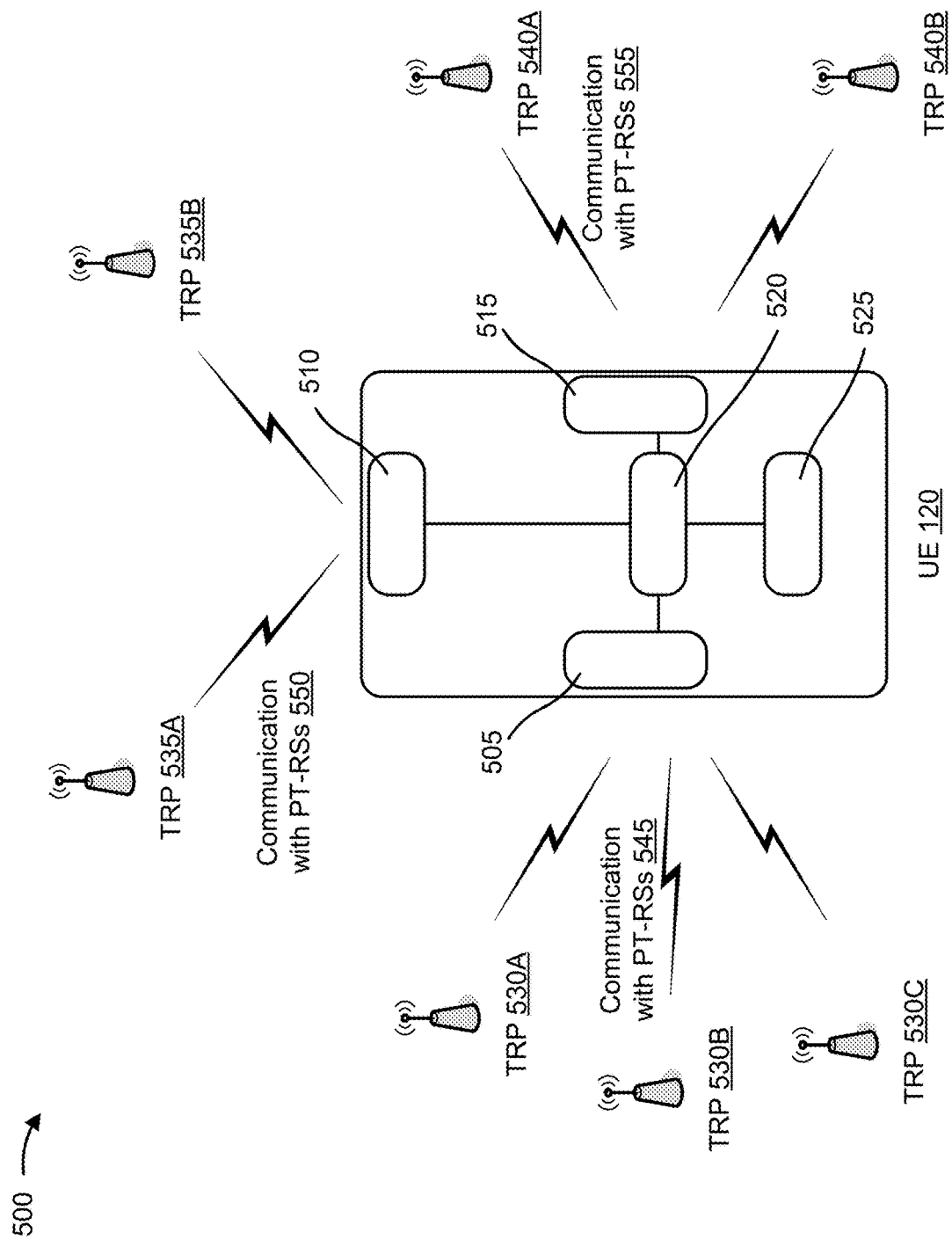

FIG. 5 is a diagram illustrating an example 500 associated with providing and/or using a multiple link capability report, in accordance with various aspects of the present disclosure. As shown in FIG. 5, a UE 120 may communicate with TRP group 530 (including TRP 530A, TRP 530B, and TRP 530C), TRP group 535 (including TRP 535A, TRP 535B), and TRP group 540 (including TRP 540A, TRP 540B,) via a wireless network. TRP group 530, TRP group 535, and TRP group 540 may be configured by one or more base stations to communicate with the UE 120.

As shown in FIG. 5, the UE 120 may communicate with the TRP group 530 via a first antenna panel 505, may communicate with the TRP group 535 via a second antenna panel 510, and may communicate with the TRP group 540 via a third antenna panel 515. The UE 120 may down-sample signals received at the antenna panels 505, 510, and 515 from a radio frequency (e.g., a carrier frequency) to an intermediate frequency (IF) for each antenna panel. After down-sampling the signals per antenna panel, the UE 120 may forward the signals to an IF to baseband (BB) converter 520. The IF to BB converter 520 may down-sample the signals from the IF frequency range to a BB frequency range. The UE 120 may forward the signals to one or more BB logic devices 525 to convert the signals to data, control information, and/or the like.

The UE may receive a communication with PT-RSs 545 from TRP 530B. In some aspects, the UE may use the communication with PT-RSs 545 to estimate and correct phase error for a communication from TRP 530A and/or a communication from TRP 530C (e.g., based at least in part on the communication from TRP 530A and/or the communication from TRP 530C being received via a same antenna panel of the UE).

The UE may receive a communication with PT-RSs 550 from TRP 535A. In some aspects, the UE may use the communication with PT-RSs 550 to estimate and correct phase error for a communication from TRP 535B (e.g., based at least in part on the communication from TRP 535A being received via a same antenna panel of the UE).

The UE may receive a communication with PT-RSs 555 from TRP 540A. In some aspects, the UE may use the communication with PT-RSs 555 to estimate and correct phase error for a communication from TRP 540B (e.g., based at least in part on the communication from TRP 540A being received via a same antenna panel of the UE).

As indicated above, FIG. 5 is provided as an example. Other examples may differ from what is described with respect to FIG. 5.

Figure 6:
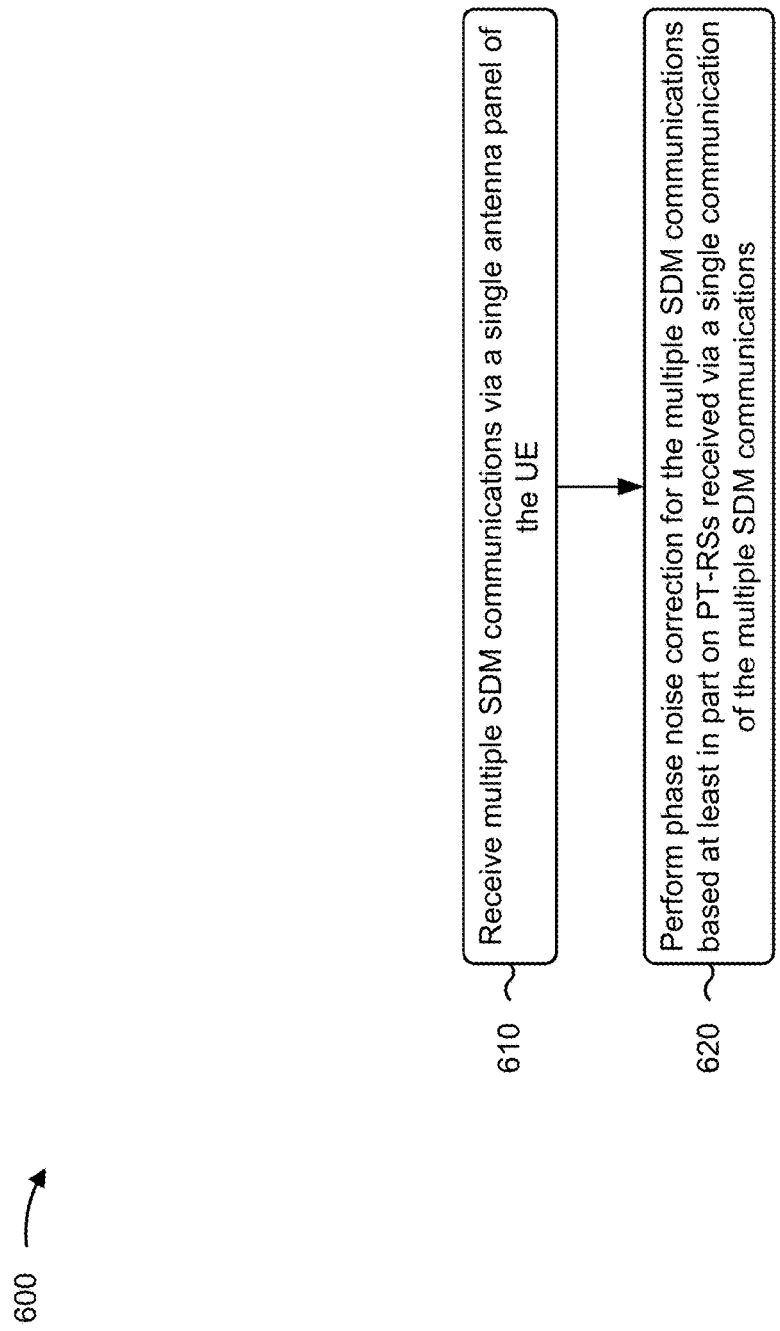
FIGS. 6 and 7 are diagrams illustrating example processes associated with reference signal port allocation for communications with multiple transmission reception points, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with reference signal port allocation.

As shown in FIG. 6, in some aspects, process 600 may include receiving multiple SDM communications via a single antenna panel of the UE (block 610). For example, the UE (e.g., using reception component 802, depicted in FIG. 8) may receive multiple SDM communications via a single antenna panel of the UE, as described above.

As further shown in FIG. 6, in some aspects, process 600 may include performing phase noise correction for the multiple SDM communications based at least in part on PT-RSs received via a single communication of the multiple SDM communications (block 620). For example, the UE (e.g., using phase noise correction component 808, depicted in FIG. 8) may perform phase noise correction for the multiple SDM communications based at least in part on PT-RSs received via a single communication of the multiple SDM communications, as described above.

Process 600 may include additional aspects, such as any single aspect or any combination of aspects described below and/or in connection with one or more other processes described elsewhere herein.

In a first aspect, process 600 includes transmitting an indication of TCI state identifications associated with the multiple SDM communications, wherein the TCI state identifications are associated with the single antenna panel of the UE.

In a second aspect, alone or in combination with the first aspect, process 600 includes transmitting an indication that the TCI state identifications are associated with the single antenna panel of the UE, wherein the TCI state identifications are associated with the single antenna panel of the UE based at least in part on transmission of the indication.

In a third aspect, alone or in combination with one or more of the first and second aspects, transmission of the indication that the TCI state identifications are associated with the single antenna panel of the UE comprises transmission, via a single communication, of the indication of TCI state identifications and the indication that the TCI state identifications are associated with the single antenna panel of the UE.

In a fourth aspect, alone or in combination with one or more of the first through third aspects, the single communication comprises one or more of a beam management procedure communication, an RSRP report, or an SINR report.

In a fifth aspect, alone or in combination with one or more of the first through fourth aspects, the phase noise correction comprises phasing noise correction based at least in part on receiver phase noise.

In a sixth aspect, alone or in combination with one or more of the first through fifth aspects, process 600 includes receiving one or more additional SDM communications via an additional antenna panel of the UE, and performing phase noise correction for the one or more additional SDM communications based at least in part on PT-RSs received via a single additional communication of the one or more additional SDM communications.

In a seventh aspect, alone or in combination with one or more of the first through sixth aspects, process 600 includes transmitting a set of indications of TCI state identifications associated with one or more reference signals received via one or more transmission reception points and indicating antenna panels of the UE that are associated with the TCI state identifications.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
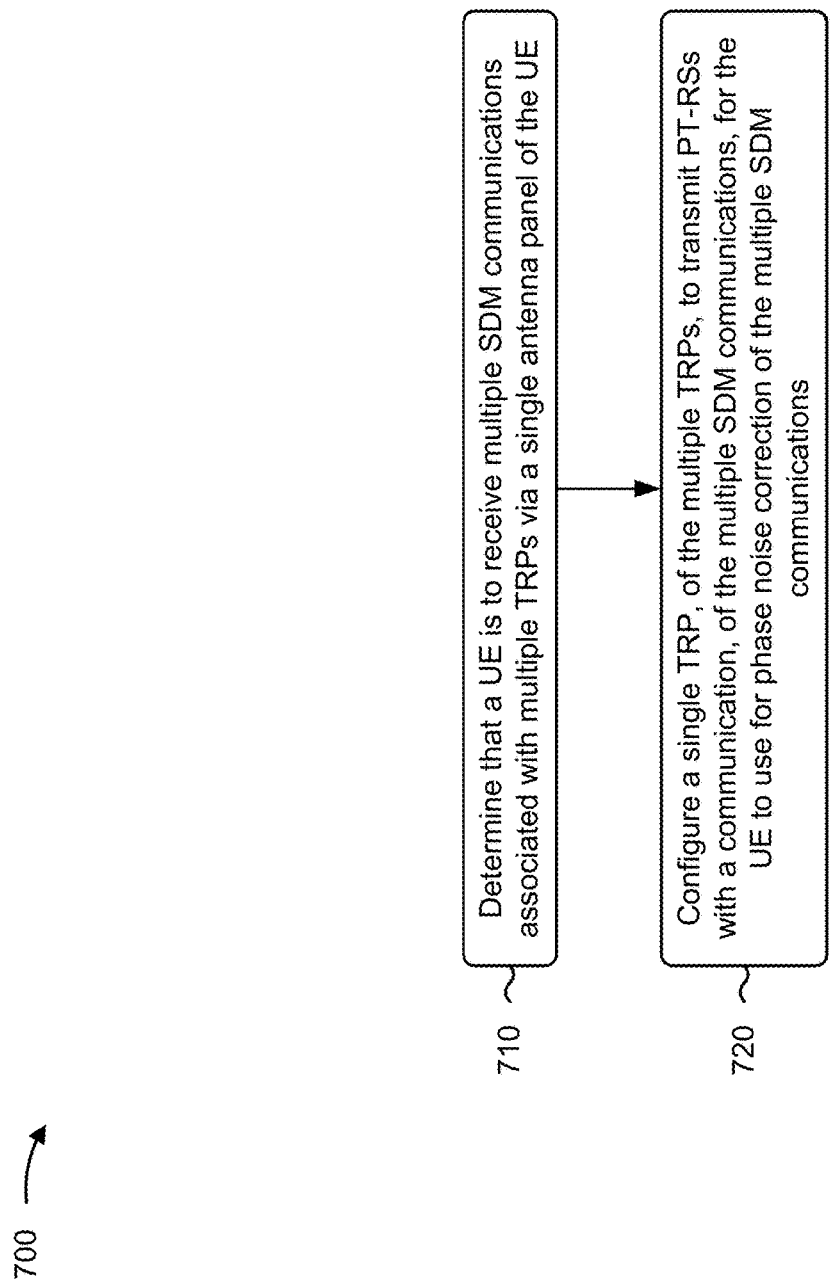

FIG. 7 is a diagram illustrating an example process 700 performed, for example, by a base station, in accordance with various aspects of the present disclosure. Example process 700 is an example where the base station (e.g., base station 110) performs operations associated with reference signal port allocation.

As shown in FIG. 7, in some aspects, process 700 may include determining that a UE is to receive multiple SDM communications associated with multiple TRPs via a single antenna panel of the UE (block 710). For example, the base station (e.g., using determination component 908, depicted in FIG. 9) may determine that a UE is to receive multiple SDM communications associated with multiple TRPs via a single antenna panel of the UE, as described above.

As further shown in FIG. 7, in some aspects, process 700 may include configuring a single TRP, of the multiple TRPs, to transmit PT-RSs with a communication, of the multiple SDM communications, for the UE to use for phase noise correction of the multiple SDM communications (block 720). For example, the base station (e.g., using configuration component 910, depicted in FIG. 9) may configure a single TRP, of the multiple TRPs, to transmit PT-RSs with a communication, of the multiple SDM communications, for the UE to use for phase noise correction of the multiple SDM communications, as described above.

Process 700 may include additional aspects, such as any single aspect or any combination of aspects described below and/or in connection with one or more other processes described elsewhere herein.

In a first aspect, process 700 includes receiving an indication of TCI state identifications associated with the multiple SDM communications, wherein the TCI state identifications are associated with the single antenna panel of the UE.

In a second aspect, alone or in combination with the first aspect, process 700 includes receiving an indication that the TCI state identifications are associated with the single antenna panel of the UE, wherein the TCI state identifications are associated with the single antenna panel of the UE based at least in part on reception of the indication.

In a third aspect, alone or in combination with one or more of the first and second aspects, reception of the indication that the TCI state identifications are associated with the single antenna panel of the UE comprises reception, via a single communication, of the indication of TCI state identifications and the indication that the TCI state identifications are associated with the single antenna panel of the UE.

In a fourth aspect, alone or in combination with one or more of the first through third aspects, the single communication comprises one or more of a beam management procedure communication, an RSRP report, or an SINR report.

In a fifth aspect, alone or in combination with one or more of the first through fourth aspects, the phase noise correction comprises phasing noise correction based at least in part on receiver phase noise.

In a sixth aspect, alone or in combination with one or more of the first through fifth aspects, process 700 includes determining that the UE is to receive multiple additional SDM communications associated with multiple additional TRPs via an additional single antenna panel of the UE, and configuring a single additional TRP, of the multiple additional TRPs, to transmit PT-RSs with an additional communication of the multiple additional SDM communications for the UE to use for phase noise correction for the multiple additional SDM communication.

In a seventh aspect, alone or in combination with one or more of the first through sixth aspects, process 700 includes receiving a set of indications of TCI state identifications associated with one or more reference signals received by the UE via one or more transmission reception points, and determining antenna panels of the UE that are associated with the TCI state identifications, wherein determining that the UE is to receive the multiple SDM communications associated with the multiple TRPs via the single antenna panel of the UE is based at least in part on determining the antenna panels of the UE that are associated with the TCI state identifications.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
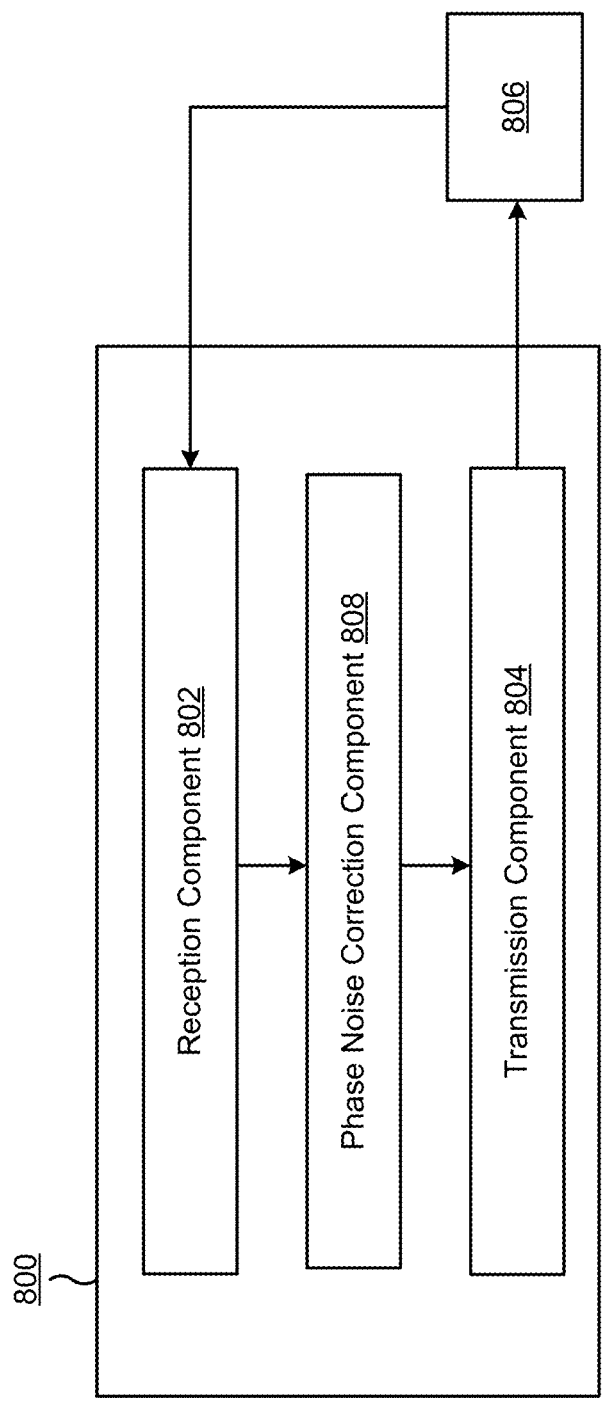
FIGS. 8 and 9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a phase noise correction component 808.

In some aspects, the apparatus 800 may be configured to perform one or more operations described herein in connection with FIGS. 4-5. Additionally or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

The reception component 802 may receive multiple SDM communications via a single antenna panel of the UE. The phase noise correction component 808 may perform phase noise correction for the multiple SDM communications based at least in part on PT-RSs received via a single communication of the multiple SDM communications. In some aspects, the phase noise correction component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 804 may transmit an indication of TCI state identifications associated with the multiple SDM communications wherein the TCI state identifications are associated with the single antenna panel of the UE.

The transmission component 804 may transmit an indication that the TCI state identifications are associated with the single antenna panel of the UE wherein the TCI state identifications are associated with the single antenna panel of the UE based at least in part on transmission of the indication.

The reception component 802 may receive one or more additional SDM communications via an additional antenna panel of the UE.

The phase noise correction component 808 may perform phase noise correction for the one or more additional SDM communications based at least in part on PT-RSs received via a single additional communication of the one or more additional SDM communications. In some aspects, the phase noise correction component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 804 may transmit a set of indications of TCI state identifications associated with one or more reference signals received via one or more transmission reception points.

The transmission component 804 may indicate antenna panels of the UE that are associated with the TCI state identifications. In some aspects, the transmission component 804 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
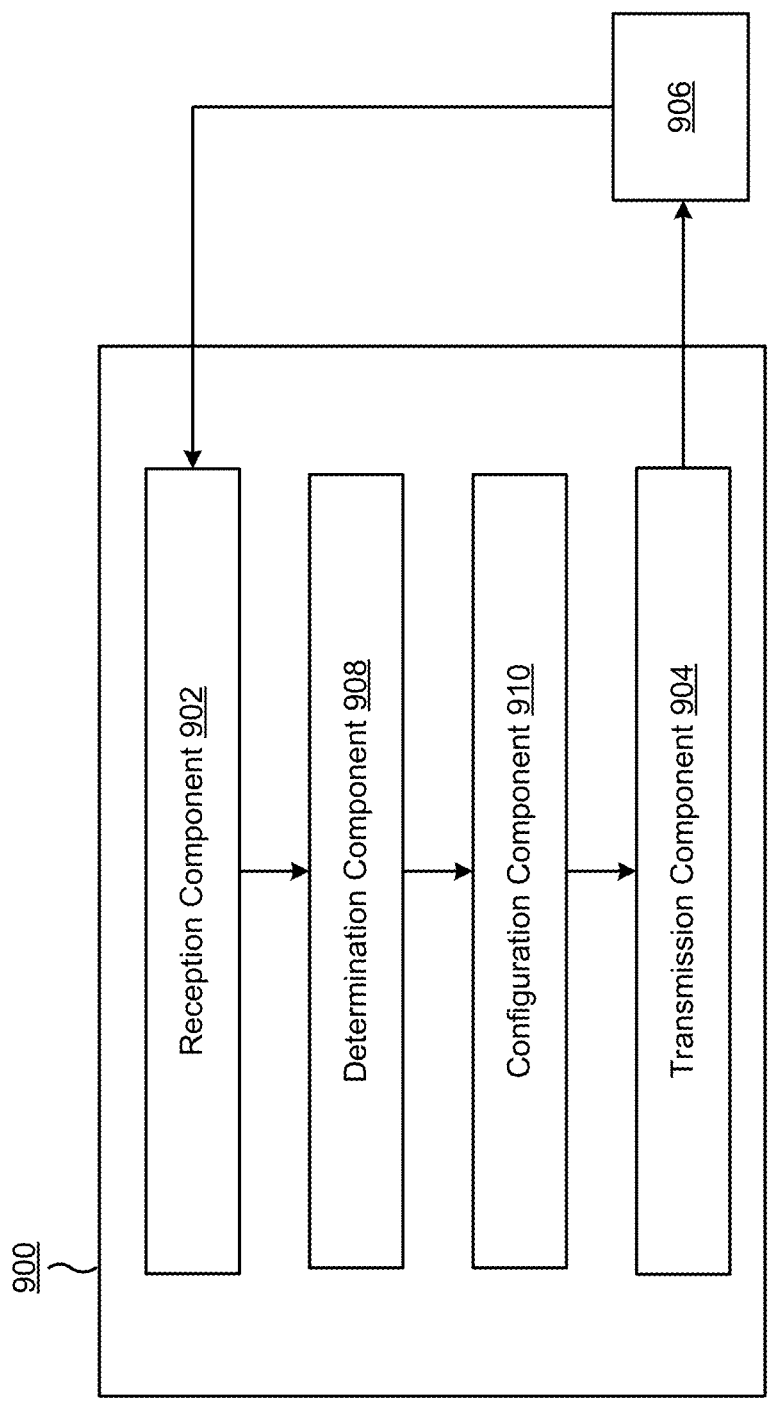

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908 and/or a configuration component 910, among other examples.

In some aspects, the apparatus 900 may be configured to perform one or more operations described herein in connection with FIGS. 4-5. Additionally or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be collocated with the reception component 902 in a transceiver.

The determination component 908 may determine that a UE is to receive multiple SDM communications associated with multiple TRPs via a single antenna panel of the UE. The determination component 908 may determine that the UE is to receive multiple additional SDM communications associated with multiple additional TRPs via an additional single antenna panel of the UE. The determination component 908 may determine antenna panels of the UE that are associated with the TCI state identifications wherein determining that the UE is to receive the multiple SDM communications associated with the multiple TRPs via the single antenna panel of the UE is based at least in part on determining the antenna panels of the UE that are associated with the TCI state identifications. In some aspects, the determination component 908 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The configuration component 910 may configure a single TRP, of the multiple TRPs, to transmit PT-RSs with a communication, of the multiple SDM communications, for the UE to use for phase noise correction of the multiple SDM communications. The configuration component 910 may configure a single additional TRP, of the multiple additional TRPs, to transmit PT-RSs with an additional communication of the multiple additional SDM communications for the UE to use for phase noise correction for the multiple additional SDM communication. In some aspects, the configuration component 910 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The reception component 902 may receive an indication of TCI state identifications associated with the multiple SDM communications wherein the TCI state identifications are associated with the single antenna panel of the UE.

The reception component 902 may receive an indication that the TCI state identifications are associated with the single antenna panel of the UE wherein the TCI state identifications are associated with the single antenna panel of the UE based at least in part on reception of the indication.

The reception component 902 may receive a set of indications of TCI state identifications associated with one or more reference signals received by the UE via one or more transmission reception points.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving multiple spatial dimension multiplexed (SDM) communications associated with multiple transmission reception points (TRPs) via a single antenna panel of the UE;
    estimating a phase noise based on phase tracking reference signals (PT-RSs) received via a single communication of the multiple SDM communications; and
    performing phase noise correction for the multiple SDM communications based at least in part on estimating the phase noise received via the single communication of the multiple SDM communications.

2. The method of claim 1, further comprising:
    transmitting an indication of transmission configuration indicator (TCI) state identifications associated with the multiple SDM communications,
        wherein the TCI state identifications are associated with the single antenna panel of the UE.

3. The method of claim 2, further comprising:
    transmitting an indication that the TCI state identifications are associated with the single antenna panel of the UE,
        wherein the TCI state identifications are associated with the single antenna panel of the UE based at least in part on transmission of the indication.

4. The method of claim 3, wherein transmission of the indication that the TCI state identifications are associated with the single antenna panel of the UE comprises:
    transmission, via the single communication, of the indication of TCI state identifications and the indication that the TCI state identifications are associated with the single antenna panel of the UE.

5. The method of claim 4, wherein the single communication comprises one or more of:
a beam management procedure communication,
a reference signal received power report, or
a signal-to-interference-plus-noise ratio report.

6. The method of claim 1, wherein the phase noise comprises receiver phase noise.

7. The method of claim 1, further comprising:
receiving one or more additional SDM communications via an additional antenna panel of the UE; and
performing phase noise correction for the one or more additional SDM communications based at least in part on PT-RSs received via a single additional communication of the one or more additional SDM communications.

8. The method of claim 1, further comprising:
transmitting a set of indications of transmission configuration indicator (TCI) state identifications associated with one or more reference signals received via one or more transmission reception points, and
indicating antenna panels of the UE that are associated with the TCI state identifications.

9. A method of wireless communication performed by a base station, comprising:
determining that a user equipment (UE) is to receive multiple spatial dimension multiplexed (SDM) communications associated with multiple transmission reception points (TRPs) via a single antenna panel of the UE;
configuring a single TRP, of the multiple TRPs, to transmit phase tracking reference signals (PT-RSs) with a single communication, of the multiple SDM communications, for the UE to use for phase noise correction of the multiple SDM communications; and
sending, to the UE, configuration information indicating that the UE is to estimate and correct phase noise for the multiple SDM communications received via the single antenna panel based on the PT-RSs of the single communication.

10. The method of claim 9, further comprising:
receiving an indication of transmission configuration indicator (TCI) state identifications associated with the multiple SDM communications,
wherein the TCI state identifications are associated with the single antenna panel of the UE.

11. The method of claim 10, further comprising:
receiving an indication that the TCI state identifications are associated with the single antenna panel of the UE,
wherein the TCI state identifications are associated with the single antenna panel of the UE based at least in part on reception of the indication.

12. The method of claim 11, wherein reception of the indication that the TCI state identifications are associated with the single antenna panel of the UE comprises:
reception, via a single communication, of the indication of TCI state identifications and the indication that the TCI state identifications are associated with the single antenna panel of the UE.

13. The method of claim 12, wherein the single communication comprises one or more of:
a beam management procedure communication,
a reference signal received power report, or
a signal-to-interference-plus-noise ratio report.

14. The method of claim 9, wherein the phase noise correction comprises:
phase noise correction based at least in part on receiver phase noise.

15. The method of claim 9, further comprising:
determining that the UE is to receive multiple additional SDM communications associated with multiple additional TRPs via an additional single antenna panel of the UE; and
configuring a single additional TRP, of the multiple additional TRPs, to transmit PT-RSs with an additional communication of the multiple additional SDM communications for the UE to use for phase noise correction for the multiple additional SDM communication.

16. The method of claim 9, further comprising:
receiving a set of indications of transmission configuration indicator (TCI) state identifications associated with one or more reference signals received by the UE via one or more transmission reception points; and
determining antenna panels of the UE that are associated with the TCI state identifications,
wherein determining that the UE is to receive the multiple SDM communications associated with the multiple TRPs via the single antenna panel of the UE is based at least in part on determining the antenna panels of the UE that are associated with the TCI state identifications.

17. A user equipment (UE) for wireless communication, comprising:
a memory; and
one or more processors operatively coupled to the memory, the memory and the one or more processors configured to:
receive multiple spatial dimension multiplexed (SDM) communications associated with multiple transmission reception points (TRPs) via a single antenna panel of the UE;
estimate a phase noise based on phase tracking reference signals (PT-RSs) received via a single communication of the multiple SDM communications; and
perform phase noise correction for the multiple SDM communications based at least in part on estimating the phase noise received via a single communication of the multiple SDM communications.

18. The UE of claim 17, wherein the one or more processors are further configured to:
transmit an indication of transmission configuration indicator (TCI) state identifications associated with the multiple SDM communications,
wherein the TCI state identifications are associated with the single antenna panel of the UE.

19. The UE of claim 18, wherein the one or more processors are further configured to:
transmit an indication that the TCI state identifications are associated with the single antenna panel of the UE,
wherein the TCI state identifications are associated with the single antenna panel of the UE based at least in part on transmission of the indication.

20. The UE of claim 19, wherein transmission of the indication that the TCI state identifications are associated with the single antenna panel of the UE comprises:
transmission, via the single communication, of the indication of TCI state identifications and the indication that the TCI state identifications are associated with the single antenna panel of the UE.

21. The UE of claim 20, wherein the single communication comprises one or more of:
a beam management procedure communication,
a reference signal received power report, or
a signal-to-interference-plus-noise ratio report.

22. The UE of claim 17, wherein the one or more processors are further configured to:
  receive one or more additional SDM communications via an additional antenna panel of the UE; and
  perform phase noise correction for the one or more additional SDM communications based at least in part on PT-RSs received via a single additional communication of the one or more additional SDM communications.

23. The UE of claim 17, wherein the one or more processors are further configured to:
  transmit a set of indications of transmission configuration indicator (TCI) state identifications associated with one or more reference signals received via one or more transmission reception points, and
  indicate antenna panels of the UE that are associated with the TCI state identifications.

24. A base station for wireless communication, comprising:
  a memory; and
  one or more processors operatively coupled to the memory, the memory and the one or more processors configured to:
    determine that a user equipment (UE) is to receive multiple spatial dimension multiplexed (SDM) communications associated with multiple transmission reception points (TRPs) via a single antenna panel of the UE; and
    configure a single TRP, of the multiple TRPs, to transmit phase tracking reference signals (PT-RSs) with a single communication, of the multiple SDM communications, for the UE to use for phase noise correction of the multiple SDM-communications, and
    send, to the UE, configuration information indicating that the UE is to estimate and correct phase noise for the multiple SDM communications received via the single antenna panel based on the PT-RSs of the single communication.

25. The base station of claim 24, wherein the one or more processors are further configured to:
  receive an indication of transmission configuration indicator (TCI) state identifications associated with the multiple SDM communications,
    wherein the TCI state identifications are associated with the single antenna panel of the UE.

26. The base station of claim 25, wherein the one or more processors are further configured to:
  receive an indication that the TCI state identifications are associated with the single antenna panel of the UE,
    wherein the TCI state identifications are associated with the single antenna panel of the UE based at least in part on reception of the indication.

27. The base station of claim 26, wherein reception of the indication that the TCI state identifications are associated with the single antenna panel of the UE comprises:
  reception, via a single communication, of the indication of TCI state identifications and the indication that the TCI state identifications are associated with the single antenna panel of the UE.

28. The base station of claim 27, wherein the single communication comprises one or more of:
  a beam management procedure communication,
  a reference signal received power report, or
  a signal-to-interference-plus-noise ratio report.

29. The base station of claim 24, wherein the one or more processors are further configured to:
  determine that the UE is to receive multiple additional SDM communications associated with multiple additional TRPs via an additional single antenna panel of the UE; and
  configure a single additional TRP, of the multiple additional TRPs, to transmit PT-RSs with an additional communication of the multiple additional SDM communications for the UE to use for phase noise correction for the multiple additional SDM communication.

30. The base station of claim 24, wherein the one or more processors are further configured to:
  receive a set of indications of transmission configuration indicator (TCI) state identifications associated with one or more reference signals received by the UE via one or more transmission reception points; and
  determine antenna panels of the UE that are associated with the TCI state identifications,
    wherein determining that the UE is to receive the multiple SDM communications associated with the multiple TRPs via the single antenna panel of the UE is based at least in part on determining the antenna panels of the UE that are associated with the TCI state identification.

* * * * *